July 17, 1934.  E. R. LE MANQUAIS  1,966,451
OUTLET BOX AND SUPPORT THEREFOR
Filed Aug. 18, 1930  2 Sheets-Sheet 1
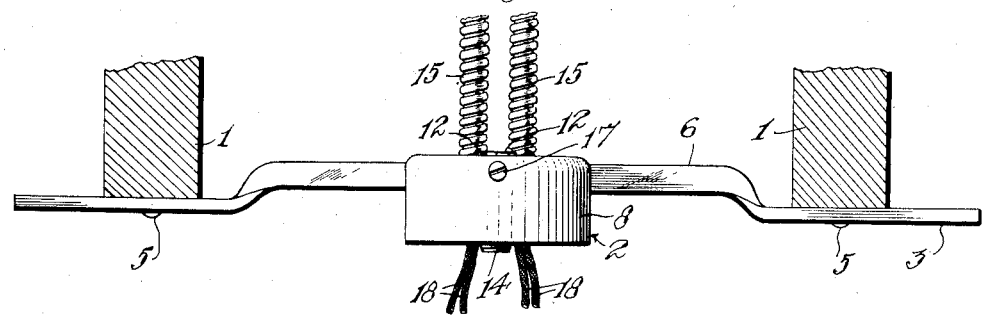
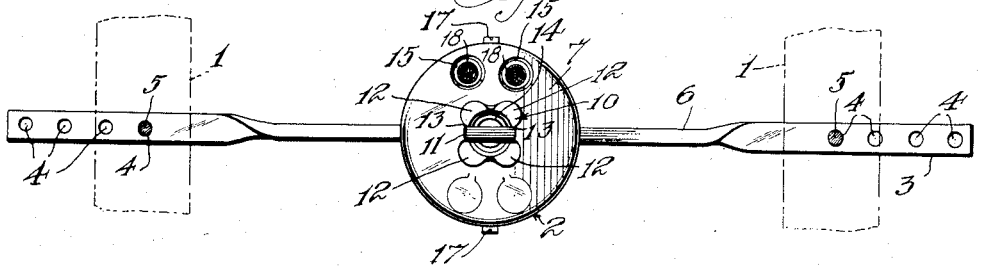
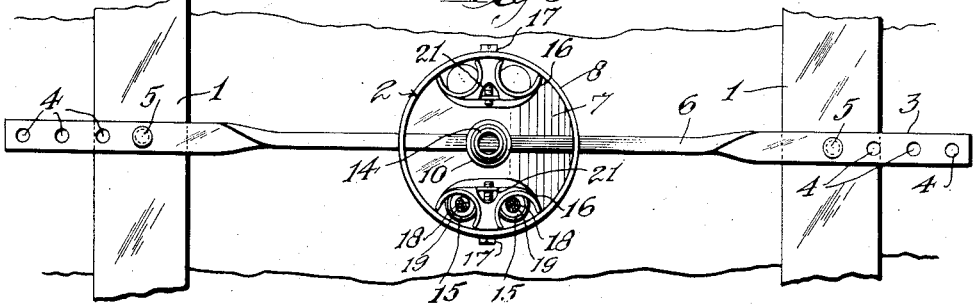
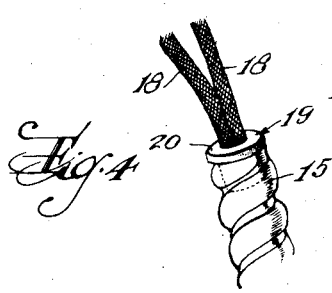 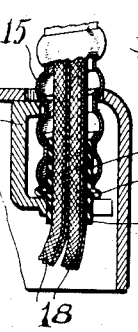 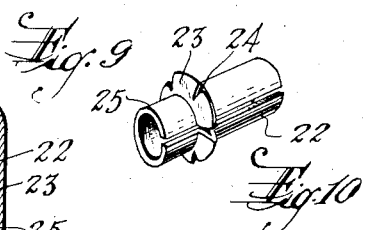
INVENTOR
Ernest R. Le Manquais,
BY
Everett H. Cook,
ATTORNEYS.

July 17, 1934.  E. R. LE MANQUAIS  1,966,451
OUTLET BOX AND SUPPORT THEREFOR
Filed Aug. 18, 1930    2 Sheets-Sheet 2
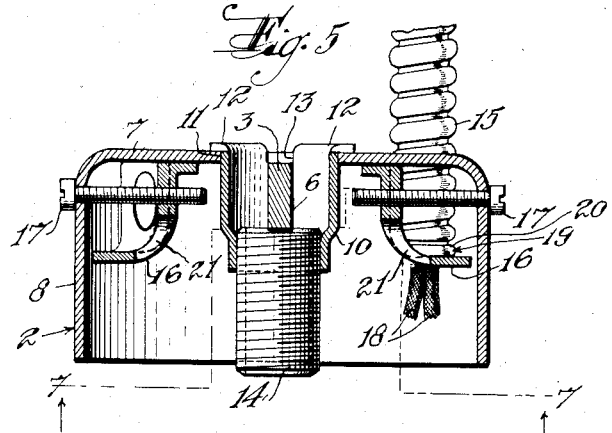
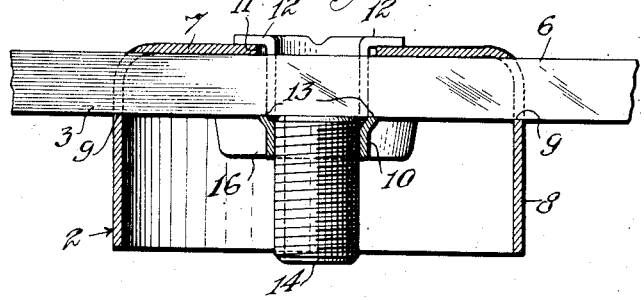
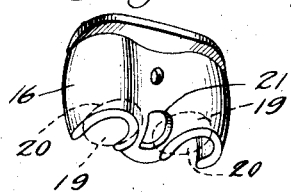
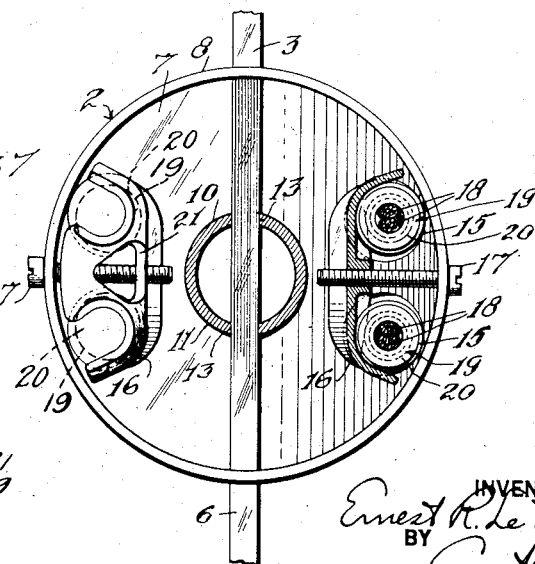

Patented July 17, 1934

1,966,451

UNITED STATES PATENT OFFICE 1,966,451

OUTLET BOX AND SUPPORT THEREFOR

Ernest R. Le Manquais, Plainfield, N. J.

Application August 18, 1930, Serial No. 475,926

10 Claims. (Cl. 247—22)

The objects of this invention are to combine with an outlet box having a central threaded stud a supporting bar for said outlet box in such a construction that a fixture-supporting nipple screwed to said stud will lock the outlet box with a double frictional contact with respect to the supporting bar; to enable the threaded stud to be made detachable from the outlet box and secured thereto by the supporting bar; to enable a supporting bar to be employed in upright edgewise position for its portion which extends through the outlet box; to enable a supporting bar to extend through the outlet box inside the same, passing through the side walls of the box and underlying its bottom; to facilitate inspection of the cables leading into the box, and to secure other advantages and results as will be brought out in the following description.

Referring to the accompanying drawings, in which like characters of reference indicate the same parts throughout the several views, Figure 1 is a side view of an outlet box and its support in accordance with my invention and mounted in place upon the floor joists of a building;

Figure 2 is a plan of the same;

Figure 3 is an underneath plan, looking upward;

Figure 4 is a detail view of a certain fiber bushing employed around the wires extending through the BX cable;

Figure 5 is a detail central section of the outlet box transversely of its supporting bar;

Figure 6 is a similar cross-section longitudinally of the supporting bar;

Figure 7 is a view of the open end of the outlet box and support, partly in section on line 7—7 of Fig. 5, Figure 8 is a detail perspective view of the cable clamps.

Figure 9 is a fragmentary transverse vertical sectional view through the outlet box and one end of one cable clamp, showing a different type of insulating bushing or ferrule, and Figure 10 is a detached perspective view of the insulated bushing.

In the specific embodiment of the invention shown in said drawings, 1, 1 indicate floor joists at the ceiling of a room in which an outlet box 2 is to be mounted, and 3 is a metal bar the ends of which have series of holes 4 through suitable ones of which nails 5 are driven into the lower edges of the floor joists 1 to secure said bar thereto and thus support the outlet box in position. The bar 3 is shown having its ends of greater width than thickness, and the middle portion 6 twisted to stand edgewise and raised somewhat into the space between the floor joists 1, 1 to properly position the outlet box 2.

Said outlet box has a bottom 7 and side wall 8, and provides a transverse slideway for the supporting bar 3, so that the outlet box can be adjusted upon said supporting bar. As shown in the drawings, this is accomplished by slotting the wall 8 of the outlet box at diametrically opposite points 9, 9 to receive the middle portion 6 of the supporting bar, and said slots are shown adjacent the bottom 7 of the outlet box so that said bottom rests upon the middle portion of the bar 6 to better support the box.

A central interiorly threaded stud 10 is provided in the outlet box by inserting the same through a hole 11 in the bottom 7 of the box, the outer end of the stud 10 having outwardly extending lateral projections 12 which over lie the outside of the bottom 7 of the box to limit entry of the stud into the chamber of the outlet box. Said stud is slotted at diametrically opposite points, as at 13, 13, to receive the middle portion 6 of the supporting bar when said slots 13 are brought into alinement with the slots 9, 9, and thus by the insertion of the supporting bar through said slots after the stud 10 has been inserted into place, the said stud is locked in position. Obviously this must be done before one of the ends of the supporting bar is twisted and bent as shown, and up to that time the stud, supporting bar and body of the outlet box are separable from one another.

Into the threaded end of the stud 10 is screwed a nipple 14 which serves at its end next the supporting bar to clamp the outlet box thereon and at its other or opposite end to receive a light fixture (not shown). The nipple 14 draws the bottom wall 7 of the box into tight frictional contact with the bar 6 and itself frictionally engages the bar so as to provide a double friction lock.

The outlet box is provided in its bottom with openings to receive cable 15, 15, and clamps 16 are provided one for each pair of cables, said clamps occupying a chordal position and each adapted to clamp a pair of cables between itself and the side wall 8 of the outlet box by means of a clamping screw 17. The wires 18, 18 within each cable are at the end of the cable surrounded by a fiber bushing or ferrule 19 which fits tightly into the cable 15 and has at its end outside said cable an overlying shoulder 20. Since this ferrule is inside the clamp 16 and hidden thereby, I provide at the middle of the clamp an aperture 21 through which inspection may be made as to the bushings or ferrules of both cables and the presence or absence of said bushings or ferrules effectually noted, as clearly shown in Figures 5, 7 and 8.

Another feature of my invention is a novel and improved insulating bushing or ferrule which is shown in Figures 9 and 10 of the drawings. In the form of bushing shown in the other figures of the drawings, the wires 18 are exposed to the edges of the clamps 16 beyond the bushing, so that the insulation may easily be torn from the wires in pulling them through the cables or metallic sheath which encloses the wires. My new bushing 22 is in general similar to the bushing 19, being formed of fiber or the like and slit longitudinally as shown in Figure 10 to permit its application laterally over the insulated wires. Intermediate its ends the bushing is formed with an exterior rib or shoulder 23. This rib or shoulder may be formed in any suitable manner, but one convenient way is to form slits 24 in the bushing spaced circumferentially thereof and then compress the bushing endwise so as to deform or squeeze the slitted portion outwardly as shown in Figure 10. Of course, the rib could be molded if desired.

In use of my new bushing, one end is inserted into the metal sheath or cable around the wires 18 until the rib 23 abuts the end of the cable, as shown in Figure 9. This leaves the other end portion 25 projecting outwardly from the metallic sheath, and when the cable clamp 16 is applied it engages the side of the rib opposite the end of the metallic sheath and the projecting end 25 of the bushing. The wires 18 are thus entirely insulated and protected from abrasion or other injury by contact with the clamp. Obviously the bushing may be used in other structures than that shown and described without departing from the spirit or scope of the invention.

Various modifications may be made by those skilled in the art in carrying out my invention, without departing from the spirit and scope thereof, and therefore I do not desire to be understood as limiting myself except as required by the following claims when construed in the light of the prior art.

Having thus described the invention, what I claim is:

1. The combination of an outlet box having a central internally threaded stud, a supporting bar slidable through said stud and engaging said box to support the same, and a nipple externally threaded to receive an electric fixture and screwed into said stud to engage said supporting bar and clamp the outlet box with respect thereto.

2. The combination of an outlet box having an apertured bottom, a removable stud in said aperture having a transverse opening, a supporting bar extending slidably through said opening and the outlet box to contact with the inner side of said bottom, and a nipple threaded to receive an electric fixture and screwed upon said stud to engage said supporting bar, hold said stud in said aperture and clamp the outlet box with respect to said bar.

3. The combination of an outlet box having an apertured bottom, a threaded stud projecting into the outlet box through its said apertured bottom and having a projecting extension overlapping the bottom outside the box and a transverse opening disposed within the box, a supporting bar extending through the outlet box and said opening in said stud to contact with the inner side of the bottom of the box, and a nipple threaded to receive an electric fixture and screwed into said stud to engage said supporting bar and lock the outlet box with respect thereto.

4. The combination of an outlet box having a central threaded stud, a supporting bar slidable through said stud and engaging said box to support the same, and means adjustably secured to said stud serving both to clamp the outlet box to said supporting bar and to support an electric fixture.

5. The combination of an outlet box having a base and a skirt, a stud removably supported in the base, a supporting bar extending slidably through said stud and through the skirt of the outlet box and contacting with said base, and a supporting nipple for an electric fixture adjustably secured to said stud and adapted to engage said supporting bar to secure the stud in position and clamp the outlet box with respect to said bar.

6. The combination of an outlet box having an apertured base, a supporting bar extending through the outlet box adjacent the base, a removable interiorly threaded stud retained in said aperture by said supporting bar, and means threadedly engaging said stud serving both to support an electric fixture and to clamp the outlet box with respect to the stud.

7. The combination of an outlet box having an apertured base and a skirt portion provided with aligned vertical apertures, a supporting bar passing through said apertures, the portion of the bar intermediate the apertures being of greater vertical dimensions than horizontal, and the ends of the bar being twisted at right angles to permit the same to be attached to a supporting surface, and to prevent removal of the outlet box, an apertured stud retained in the opening in said base by said supporting bar, and means adjustably secured to said stud serving both for supporting an electrical fixture and for securing the outlet box in adjusted position upon the bar.

8. The combination of an outlet box having an apertured base portion and a skirt portion provided with aligned vertical apertures, a supporting bar slidably passing through said skirt portion in edgewise relation to the base portion and having portions beyond the skirt twisted at right angles to permit the bar to be attached to a supporting surface and to prevent removal of the outlet box, an apertured stud retained in the opening in said base by said supporting bar, and means adjustably secured to said stud serving both for supporting an electrical fixture and for securing the box in adjusted position upon the bar.

9. The combination of an outlet box having a base and a depending skirt portion, a hollow stud extending into the interior of the box, a supporting bar passing through said stud and said depending skirt, and means adjustably secured to said stud for clamping the same to said bar, said means having a portion projecting beyond the stud into the interior of the box and threaded for supporting an electric fixture.

10. The combination of an outlet box having an apertured base, a threaded stud removably mounted in said base, a bar passing through said stud and beneath the base of said outlet box to support the box, and means adjustably secured to the stud and adapted to engage said bar to clamp the stud and outlet box to the bar, said means having a portion projecting beyond the stud and threaded for supporting an electric fixture.

ERNEST R. LE MANQUAIS.